(12) United States Patent
Xu et al.

(10) Patent No.: US 12,374,088 B2
(45) Date of Patent: *Jul. 29, 2025

(54) ADDING TAGS TO SENSOR DATA VIA A PLURALITY OF MODELS AND QUERYING THE SENSOR DATA

(71) Applicant: Motional AD LLC, Boston, MA (US)

(72) Inventors: Qiang Xu, Torrance, CA (US); Oscar Beijbom, Santa Cruz, CA (US); Holger Caesar, Singapore (SG); Whye Kit Fong, Singapore (SG); Alex Lang, Culver City, CA (US); Varun Bankiti, Los Angeles, CA (US); Sourabh Vora, Marina Del Rey, CA (US)

(73) Assignee: Motional AD LLC, Boston, MA (US)

( * ) Notice: Subject to any disclaimer, the term of this patent is extended or adjusted under 35 U.S.C. 154(b) by 382 days.

This patent is subject to a terminal disclaimer.

(21) Appl. No.: 18/045,404

(22) Filed: Oct. 10, 2022

(65) Prior Publication Data

US 2023/0306722 A1 Sep. 28, 2023

Related U.S. Application Data

(63) Continuation of application No. 17/656,169, filed on Mar. 23, 2022, now Pat. No. 11,488,377.

(51) Int. Cl.
*G06V 10/774* (2022.01)
*G06V 10/70* (2022.01)
(Continued)

(52) U.S. Cl.
CPC .......... *G06V 10/774* (2022.01); *G06V 10/811* (2022.01); *G06V 10/87* (2022.01); *G06V 20/58* (2022.01)

(58) Field of Classification Search
CPC .... G06V 10/774; G06V 10/811; G06V 10/87; G06V 20/58
See application file for complete search history.

(56) References Cited

U.S. PATENT DOCUMENTS

| 9,704,054 B1 * | 7/2017 | Tappen | G06F 18/23 |
| 10,891,518 B1 * | 1/2021 | Joshi | G06N 20/20 |

(Continued)

FOREIGN PATENT DOCUMENTS

WO WO 2020/146491 A2 7/2020

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

(Continued)

*Primary Examiner* — Ming Y Hon
(74) *Attorney, Agent, or Firm* — Knobbe, Martens, Olson & Bear, LLP

(57) ABSTRACT

Provided are methods for customized tags for annotating sensor data, which can include receiving sensor data captured during a plurality of sensor data capture sessions, processing the sensor data using a plurality of machine learning models to identify a plurality of capture session collections represented in the sensor data, filtering the sensor data based at least partly on a user-specified category of the plurality of categories of capture session to identify a capture session collection, of the plurality of capture session collections, representing sensor data of one or more sensor data capture sessions that conforms to the user-specified category, and transmitting the sensor data of one or more sensor data capture sessions that conforms to the user- (Continued)

specified category to an end user computing device. Systems and computer program products are also provided.

20 Claims, 9 Drawing Sheets

(51) Int. Cl.
*G06V 10/80* (2022.01)
*G06V 20/58* (2022.01)

(56) References Cited

U.S. PATENT DOCUMENTS

| | | | |
|---|---|---|---|
| 11,308,338 | B2 | 4/2022 | Yang et al. |
| 11,488,377 | B1* | 11/2022 | Xu .......................... G06V 20/58 |
| 11,521,010 | B2 | 12/2022 | Caesar et al. |
| 2014/0198953 | A1* | 7/2014 | Tanaka ................... G06V 40/10 382/103 |
| 2018/0075309 | A1* | 3/2018 | Sathyanarayana ... G05D 1/0088 |
| 2018/0136332 | A1* | 5/2018 | Barfield, Jr. ....... G06V 10/7784 |
| 2018/0180733 | A1* | 6/2018 | Smits ...................... G06T 7/521 |
| 2019/0135306 | A1 | 5/2019 | Won |
| 2019/0289359 | A1* | 9/2019 | Sekar ................... H04N 21/4333 |
| 2019/0294966 | A1* | 9/2019 | Khan ........................ G01S 13/00 |
| 2020/0039520 | A1* | 2/2020 | Misu ...................... B60W 40/09 |
| 2020/0057442 | A1 | 2/2020 | Deiters et al. |
| 2020/0114924 | A1* | 4/2020 | Chen ...................... B60W 40/09 |
| 2020/0265247 | A1 | 8/2020 | Musk et al. |
| 2021/0101624 | A1* | 4/2021 | Philbin ................. G06F 18/251 |
| 2021/0342631 | A1 | 11/2021 | Takahashi et al. |
| 2021/0398289 | A1* | 12/2021 | Schmidt .................... G06T 7/13 |
| 2022/0068050 | A1* | 3/2022 | Kibbar ................... G06N 20/00 |
| 2022/0161815 | A1 | 5/2022 | Van Beek et al. |
| 2022/0164602 | A1 | 5/2022 | Frtunikj et al. |
| 2022/0172456 | A1* | 6/2022 | Wang ................... G06V 10/764 |
| 2022/0180252 | A1* | 6/2022 | Marvaniya .......... G06F 16/9024 |
| 2022/0207426 | A1 | 6/2022 | Scherer et al. |

OTHER PUBLICATIONS

Great Britain Office Action issued for Application No. GB 2300777. 6, dated Jul. 11, 2023.

Korean Office Action issued for Application No. KR 10-2023-0015180, dated Oct. 31, 2024.

* cited by examiner

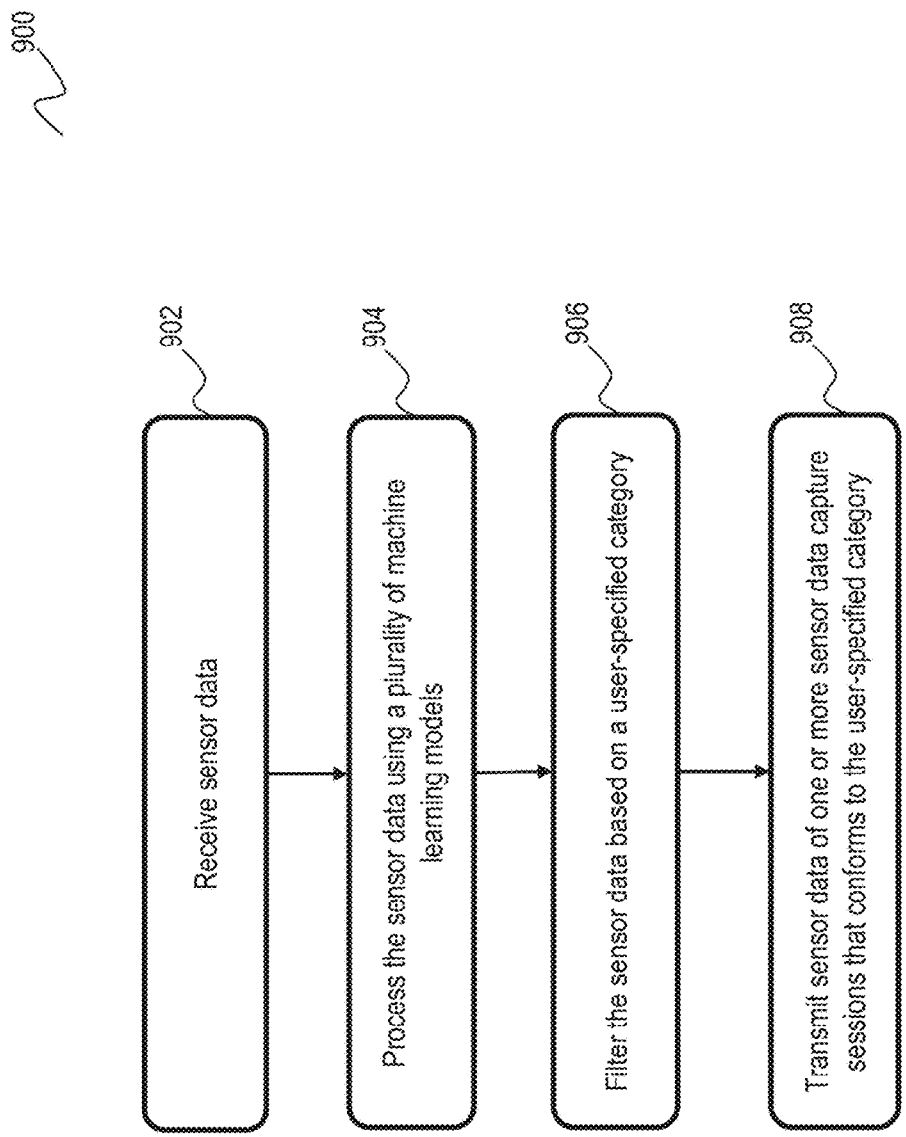

ADDING TAGS TO SENSOR DATA VIA A PLURALITY OF MODELS AND QUERYING THE SENSOR DATA

RELATED APPLICATIONS

Any and all applications for which a foreign or domestic priority claim is identified in the Application Data Sheet as filed with the present application are incorporated by reference under 37 CFR 1.57 and made a part of this specification. This application is a continuation of U.S. patent application Ser. No. 17/656,169, filed on Mar. 23, 2022, entitled ADDING TAGS TO SENSOR DATA VIA A PLURALITY OF MODELS AND QUERYING THE SENSOR DATA, which is incorporated herein by reference in its entirety.

BACKGROUND

Autonomous vehicles typically use sensor data to perceive the area around them. Identifying a subset of the sensor data for annotation to identify features or characteristics of objects in the area can be difficult and complicated.

BRIEF DESCRIPTION OF THE FIGURES

FIG. 9 is a flow diagram illustrating an example of a routine implemented by one or more processors to filter sensor data based on a user-specified category and transmit sensor data of a sensor data capture session that conforms to the user-specified category.

DETAILED DESCRIPTION

Figure 1:
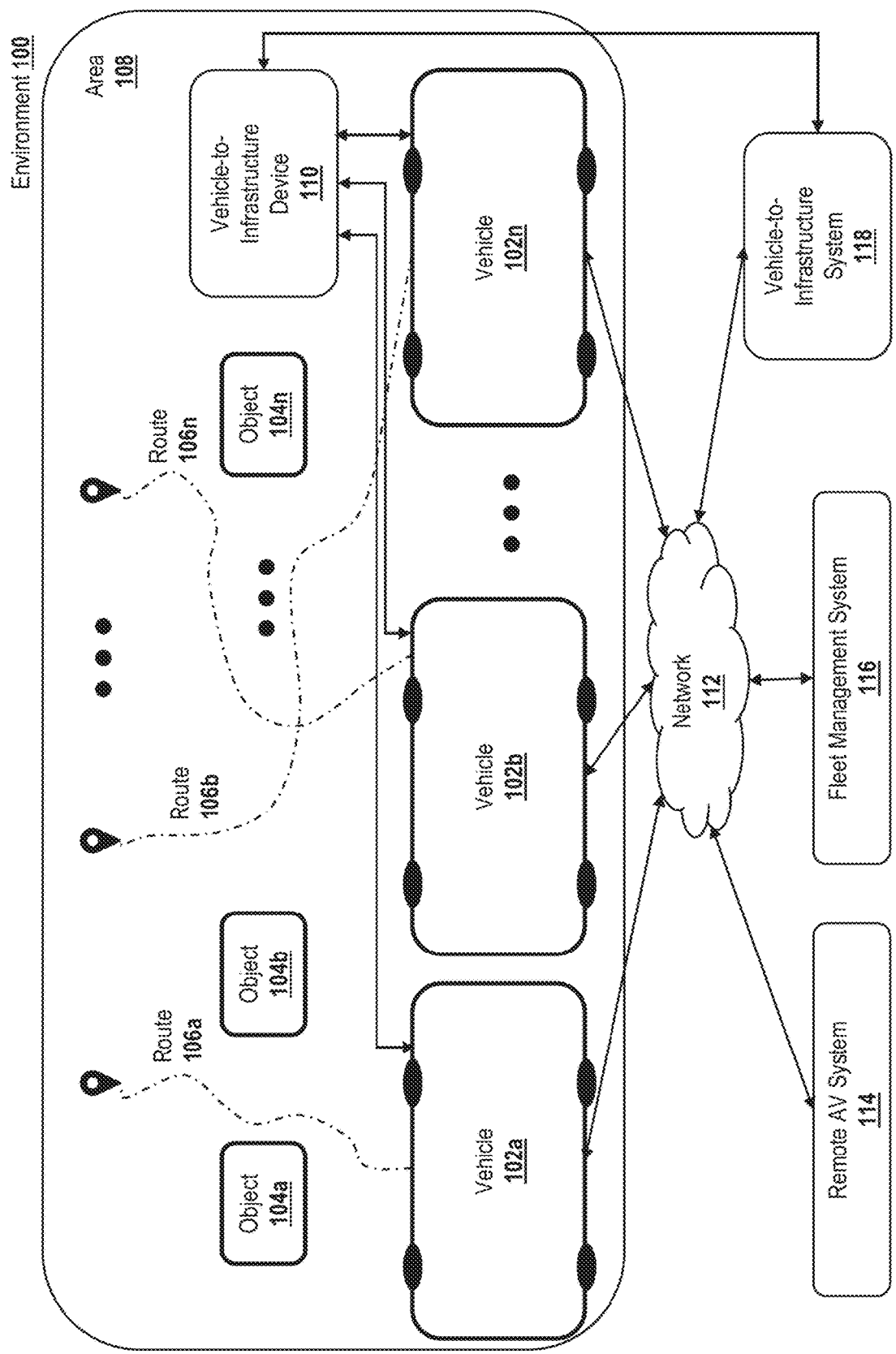
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a signal processing system to process sensor data. The sensor data can be collected over a plurality of capture sessions defined by metadata associated with the sensor data (e.g., time of data capture, vehicle, vehicle trip, sensor, group of vehicles, etc.). The signal processing system receives the sensor data and processes (e.g., mines) the sensor data using a plurality of machine learning models to identify which of the plurality of capture sessions correspond to a particular capture session collection (e.g., a particular category). Each of the machine learning models can identify one or more capture sessions that correspond to a particular capture session collection of a plurality of capture session collections represented in the sensor data. Each of the plurality of machine learning models can be a customized collection-specific machine learning model that is implemented by the signal processing system for customized searching of the sensor data. The signal processing system can filter the sensor data based on a particular category of capture session and transmit the filtered sensor data to a user computing device. For example, the signal processing system can filter the sensor data and provide the filtered sensor data for annotation of the filtered sensor data. The annotated filtered sensor data can be provided to neural networks for computer vision. The neural networks can be trained (e.g., to identify objects within sensor data) using the annotations and the sensor data. For example, the data may include an annotation identifying a stop sign, a bicycle, a vehicle, speed limit sign, etc. within an image. The annotations may be made by third parties and may not be reliable or accurate. Further, the annotations and/or the sensor data may not be relevant to a particular neural network. Identifying particularly relevant annotations can be expensive and time-consuming, and, therefore, unfiltered sensor data may be provided for annotation and the unfiltered, annotated sensor data may be used to train the neural network. Such a process for training neural networks may be inefficient and time consuming, resulting in potentially inefficiently trained neural networks.

To provide a more efficient process for training neural networks for computer vision, the signal processing system can automatically ingest sensor data and mine the ingested sensor data for a plurality of categories of capture session. The sensor data can be collected over a plurality of capture sessions defined by metadata associated with the sensor data (e.g., time of data capture, vehicle, vehicle trip, sensor, group or fleet of vehicles, etc.). The signal processing system mines the sensor data to identify categories for each of the plurality of capture sessions. The signal processing system can mine the sensor data using a plurality of machine learning models to identify which of the plurality of capture sessions correspond to a particular category (e.g., a particular capture session collection). Each of the machine learning models can identify one or more capture sessions that correspond to a particular category represented in the sensor data (e.g., a category assigned to the machine learning model). For example, each of the plurality of machine learning models can be a customized category-specific machine learning model. The signal processing system can receive a selection of a particular category of capture session. For example, the signal processing system can provide the plurality of categories of capture session to a user computing device and receive a selection of the particular category of capture session from the user computing device. The signal processing system can filter the sensor data based on the user-specified category of capture session. By filtering the sensor data, the signal processing system can identify a particular capture session collection. The signal processing system can transmit the filtered sensor data to a user computing device. As a non-limiting example, the signal processing system can route the filtered sensor data to a computing device for annotation based on determining that the filtered sensor data satisfies a particular category of capture session.

By virtue of the implementation of systems, methods, and computer program products described herein, a system can review larger quantities of (or all) sensor from a set of received sensor data. For example, the system may be able to review all received sensor data and filter the sensor data to identify a subset of the sensor data for annotation. By filtering the sensor data that is provided for annotation, the system can more efficiently annotate sensor data and more accurately and efficiently train neural networks using the annotated sensor data. Further, the system can identify sensor data that satisfies a particular category of capture session. For example, sensor data may satisfy the particular category of capture session if the sensor data includes a particular class of objects (e.g., a class of objects that occurs in less than 10%, 25%, 50%, etc. of sensor data), a particular image or scene (e.g., an image or scene that the neural network previously misclassified or an image or scene that was flagged during quality assurance), particular environmental characteristics (e.g., sensor data that was generated at a particular time of day such as after sunset), particular vehicle maneuvers (e.g., sensor data that identifies lane changes), particular pedestrian maneuvers (e.g., sensor data that identifies a pedestrian in a cross walk), etc. The filtered sensor data can be utilized to train the neural network to identify objects within a specific subset of sensor data associated with the user-specified category. Therefore, the system can improve the annotation process and training process by enabling targeted annotation and training processes for neural networks. Such a targeted annotation and training process can improve the quality and efficiency of the annotation and training process for neural networks. Additionally, such a targeted annotation and training process can reduce the cost associated with the training process. For example, the system may be able to more quickly and more accurately train neural networks by filtering the sensor data to identify specific sensor data for training neural networks.

The trained neural networks can be used to identify objects within sensor data. In some cases, the trained neural networks may be implemented within an autonomous system to identify objects within an environment of a vehicle based on received sensor data. Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
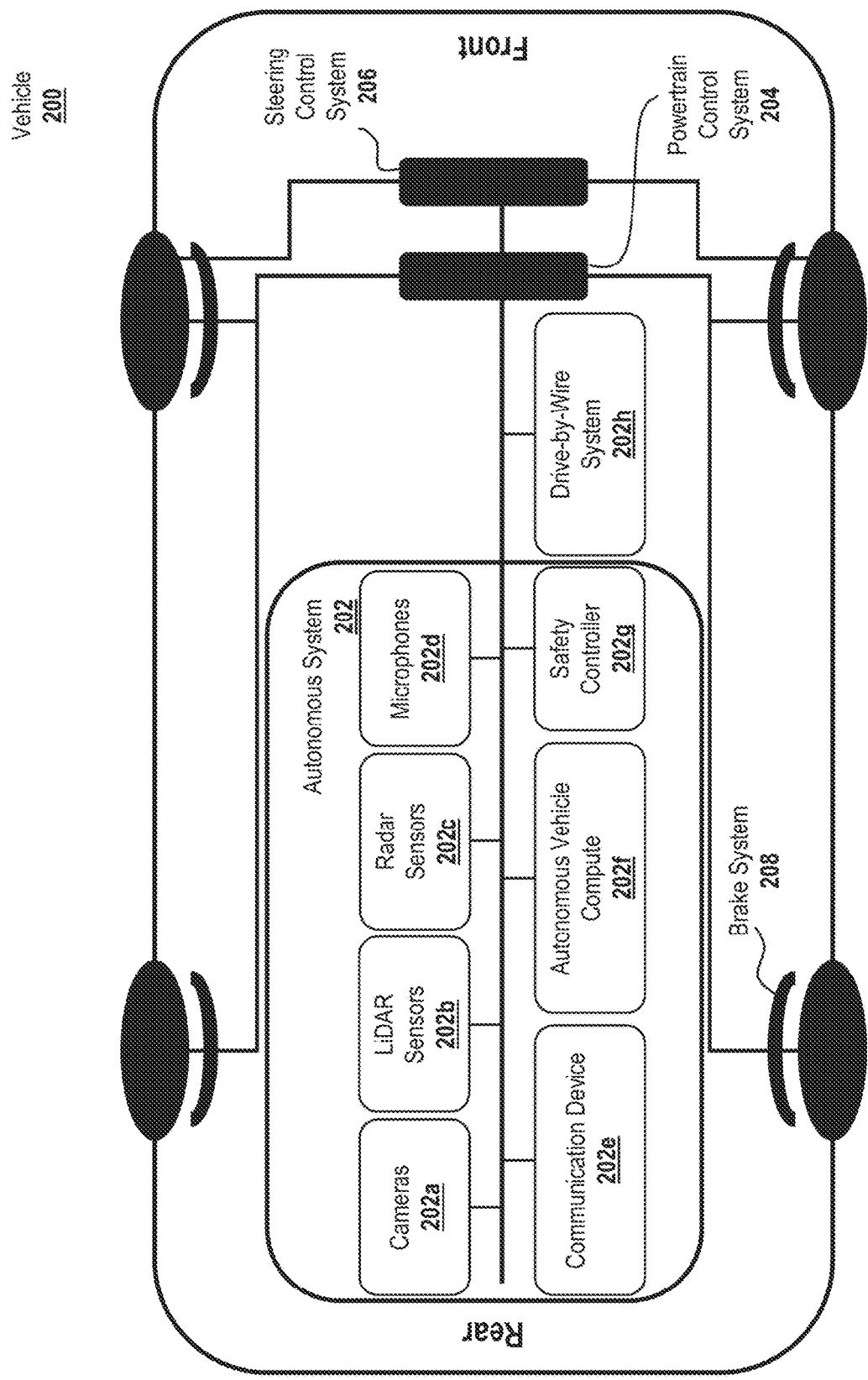
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
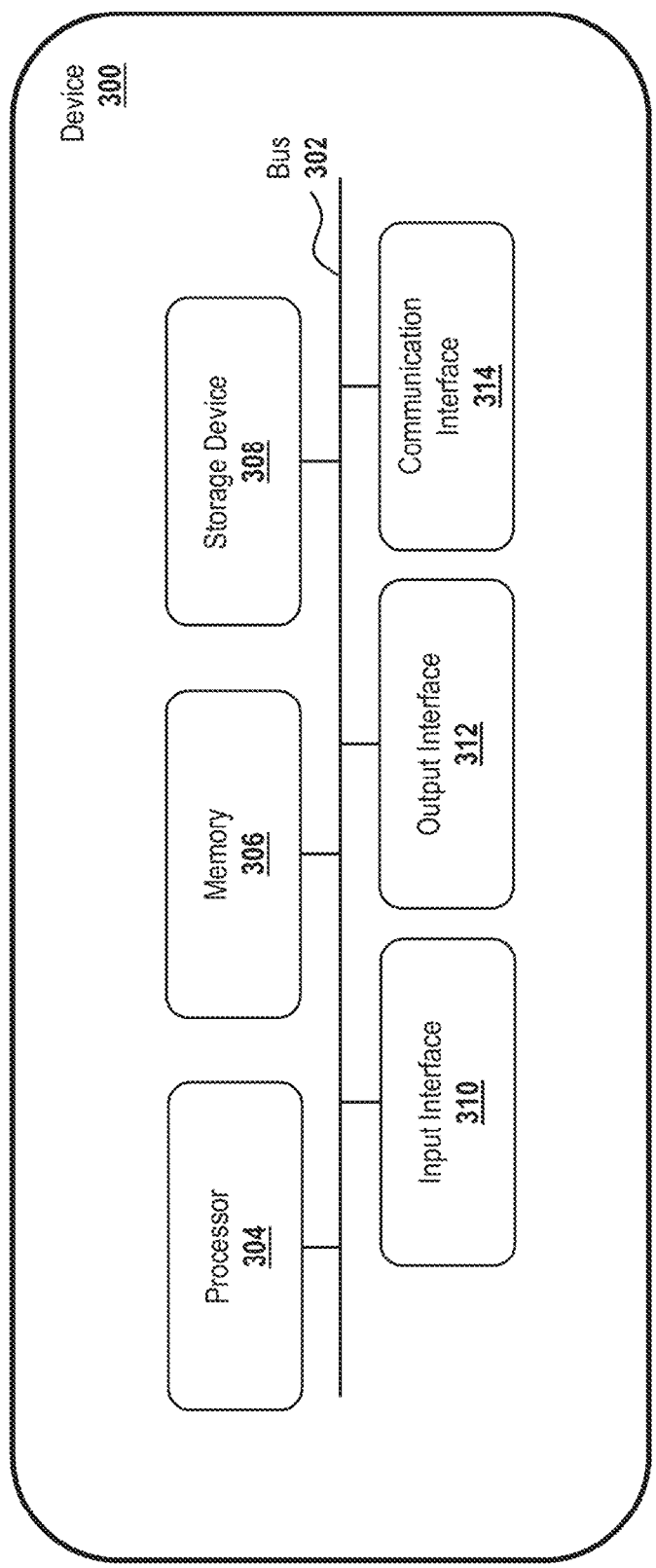
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information.

In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like).

Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Figure 4:
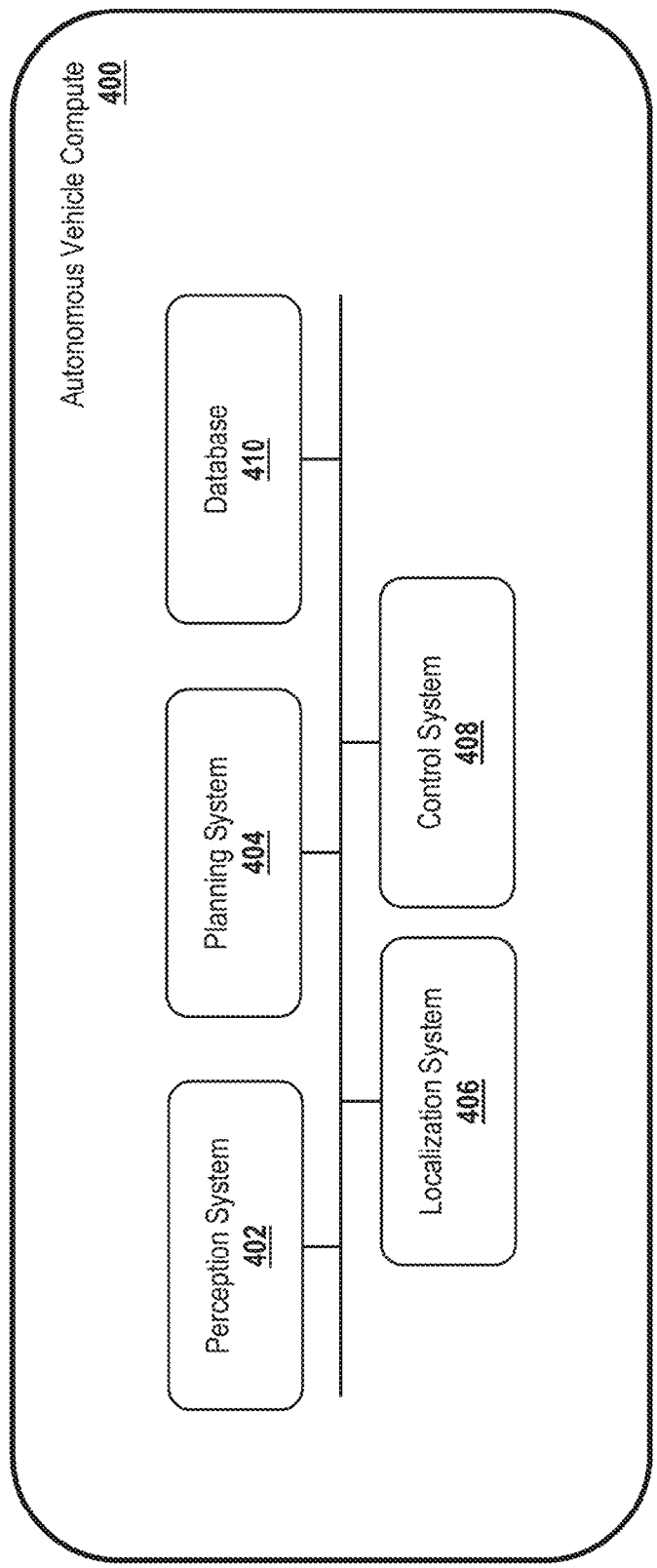
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like. In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Customizing Filters to Identify Sensor Data for Annotation

As an autonomous vehicle moves through an area, the vehicle may encounter a number of different objects within an area. In order to identify the objects, the vehicle can capture sensor data associated with an area (e.g., an image of an area). Further, the vehicle may implement a machine learning model to receive the sensor data and identify particular objects within the image of the area. As the vehicle may encounter many different objects while moving (e.g., birds, pedestrians, traffic signs, other vehicles, buildings, etc.), it may be important that the machine learning model be able to accurately identify objects. For example, it may be important that the machine learning model be able to differentiate between a bird and a human as the vehicle may elect different actions based on whether the object is a bird (e.g., turn slightly) or a human (e.g., brake). The actions associated with encountering a first object may produce adverse effects when implemented when encountering a second object. Therefore, it may be important that the machine learning model accurately identifies different objects within the image of the area. In order to accurately identify the objects, the machine learning model may be trained on a set of training data that identifies annotations for particular objects within an image. The set of training data may include sensor data that has been annotated.

However, the set of training data may be extensive. For example, the set of training data may include all sensor data generated by a particular sensor over a period of time. The sensor data may include all sensor data generated for a particular trip, a particular vehicle, etc. Therefore, the sensor data may include sensor data associated with different operating conditions of the vehicle. For example, the sensor data may include sensor data identifying different objects and/or different classes of objects, sensor data associated with different environmental characteristics (e.g., time of day, weather, etc.), sensor data identifying different maneuvers of a vehicle or a pedestrian, etc. As a particular vehicle may encounter different operating conditions, it may be important to train the machine learning model using specific portions of the set of training data. For example, it may be important to train a machine learning model to identify a pedestrian in a crosswalk and it may not be important to train the machine learning model to identify a bird in the sky based on a relevancy of each to the machine learning model (e.g., a relevancy of pedestrians in crosswalks to the machine learning model and a relevancy of birds in the sky to the machine learning model).

As the set of training data may include annotated sensor data associated with multiple operating conditions, it may be inefficient to train the machine learning model using the entire set of training data. In some cases, the training data may include sensor data generated from capture sessions on multiple vehicles. For example, the training data may include sensor data generated from a first vehicle during a first capture session and sensor data generated from a second vehicle during a second capture session. Due to the amount of potential training data, it may be inefficient and costly to train the machine learning model using the entire set of training data.

Training using the set of training data can make it inefficient and difficult for a system to train the machine learning model to identify particular objects within an image. In some cases, some systems may provide a portion of the training data to a system for manual selection of particular images for training the machine learning model. For example, a user may provide particular training data to the machine learning model for training. However, such a manual selection of particular images for training the machine learning model may be inefficient and cost prohibitive as the machine learning model may require multiple images to be trained to identify a particular object.

Additionally, there can be inaccuracies within the training data. For example, the training data may include a first annotation for a first object identifying the first object as a first object-type (e.g., a building), but the first object may be a second object-type (e.g., a bus). As the training data (e.g., annotation data) may be provided and generated by third party computing devices (e.g., associated with third party annotators), it may be important to verify whether the annotation data is correct and filter the training data used to train the machine learning model. Further, if inaccuracies exist within the training data, the machine learning model may be trained to misidentify particular objects. This potential for inaccuracies within the training data can make it difficult for a perception system to accurately and efficiently identify objects within an image of an area. In order to identify inaccuracies within the training data, some systems may provide a portion of the training data to a computing system for quality assurance (e.g., by reviewers). However, providing the training data to a computing system for quality assurance can be inefficient and cost prohibitive as the costs of the quality assurance may increase significantly as the amount of training data provided to the computing system increases.

As the process for annotating the sensor data may be time consuming and expensive, it may be important to filter the sensor data prior to providing the sensor data for annotation. As discussed above, the training data may be provided and generated by third party computing devices and it may be important to filter the sensor data provided to the third party computing devices such that the training data provided and generated by the third party computing devices is limited. The system may not be capable of identifying whether the portion of the sensor data provided to the third party computing devices for annotation includes a portion of the sensor data that is relevant to a particular machine learning model. For example, the system may identify a particular portion of sensor data that includes sensor data that is not relevant to a particular machine learning model (e.g., the sensor data may identify objects that the machine learning model was previously trained to identify, the sensor data may identify objects that the machine learning has, over a particular time period, not encountered, the sensor data may be associated with operating conditions on which the machine learning model was previously trained, etc.). While the particular portion of the sensor data may not be relevant to the particular machine learning model, the third party computing devices may generate and provide training data identifying annotations for the particular portion of the sensor data and the machine learning model may be trained using the training data. By training the machine learning model on training data that is not relevant to the machine learning model, the training process may be inefficient and time consuming. This can also lead to an inadequate user experience as the system may be unable to quickly and efficiently train the machine learning model.

To address these issues, a perception system can use a user-specified category to filter sensor data for annotation. In some cases, the perception system can process the sensor data using a plurality of machine learning models to identify capture session collections of the sensor data. Each capture session collection may represent sensor data that conforms to a particular category of capture session and the perception system may filter all or a portion of the sensor data to identify sensor data associated with the user-specified category. By proactively filtering the sensor data (instead of providing all of the sensor data to the third party computing devices for annotation) based on the user-specified category, the perception system can increase the likelihood that the training data generated and provided by the third party computing devices for training of a machine learning model is relevant to that machine learning model. For example, the perception system can filter the sensor data to identify sensor data identifying objects or classes of objects that occur in less than a threshold value of sensor data (e.g., 10%, 25%, 35%, 50%, etc.), sensor data identifying images or scenes that the machine learning model has misclassified (e.g., the sensor data identifying objects that were mislabeled, missed, or otherwise misclassified by the machine learning model), sensor data identifying particular maneuvers of a vehicle or a pedestrian, etc. Such a process to filter the sensor data provided for annotation can reduce the cost and increase the efficiency associated with training machine learning models.

As described herein, the signal processing system can receive large amounts of sensor data. The signal processing system can process (e.g., mine, parse, etc.) the sensor data and identify capture session collections of sensor data. The signal processing system can utilize the identified capture sessions collections to filter the sensor data. The signal processing system can obtain a selection of a particular filter and filter the sensor data. Therefore, the signal processing system can filter the sensor data prior to sending the filtered sensor data to a computing system for annotation.

As described herein, the sensor data may be ingested from a plurality of sensors during a plurality of sensor data capture sessions (e.g., data capture sessions). For example, the sensor data may include camera data generated by a camera image sensor, lidar data generated by a lidar sensor, radar data generated by a radar sensor, etc. Each of the plurality of sensor data capture sessions may be a separate time period, time interval, data collection period, a vehicle trip, etc. during which sensor data is captured. A subset of the sensor data may be captured by a particular sensor during a particular sensor data capture session. Therefore, the sensor data may be captured over a plurality of sensor data capture sessions and ingested by the signal processing system as a set of sensor data.

The signal processing system can process (e.g., mine) the sensor data using a plurality of machine learning models. Each of the plurality of machine learning models may be trained to define a particular category of capture session and add metadata to the sensor data identifying that the sensor data corresponds to the particular category of capture session. Sensor data may conform to a particular category of capture session based on the output of the machine learning model. For example, sensor data may conform to a particular category of capture session if the machine learning model determines that the sensor data identifies a particular object or a particular class of object (e.g., a bicycle, an ice cream truck, a blind pedestrian, etc.), identifies a particular image or scene that include a particular region (e.g., a sky), identifies particular environmental characteristics (e.g., time of day, poor lighting conditions, rain, snow, etc.), identifies particular maneuvers of the vehicle (e.g., a speed of the vehicle, a location of the vehicle, a position of the vehicle), identifies particular maneuvers of an object (e.g., a pedestrian walking in a crosswalk), etc.

By processing the sensor data, the signal processing system can identify a plurality of capture session collections represented in and/or by the sensor data. Each of the capture session collections may represent a subset of the sensor data from one or more sensor data capture sessions that conform to a particular category of capture session.

The signal processing system can provide the categories of capture session to a user computing device. For example, the signal processing system can generate and cause display of a user interface that identifies the categories of capture session. The signal processing system can obtain a selection of a user-specified category of the categories of capture session.

The signal processing system can filter the sensor data using the user-specified category. By filtering the sensor data, the signal processing system can identify a capture session collection that represents sensor data that a particular machine learning model has determined conforms to the user-specified category. Therefore, the signal processing system can filter the sensor data to identify a subset of the sensor data that conforms to a particular user-specified category.

The signal processing system can route the subset of the sensor data to a user computing device. For example, the signal processing system can generate and/or cause display of a user interface that includes a visualization of the subset of the sensor data. The signal processing system can route the subset of the sensor data to the user computing device for annotation. In response to receiving the subset of the sensor data, the user computing device can generate training data that includes annotations for the subset of the sensor data. The user computing device may route the training data for training of a machine learning model.

Figure 5:
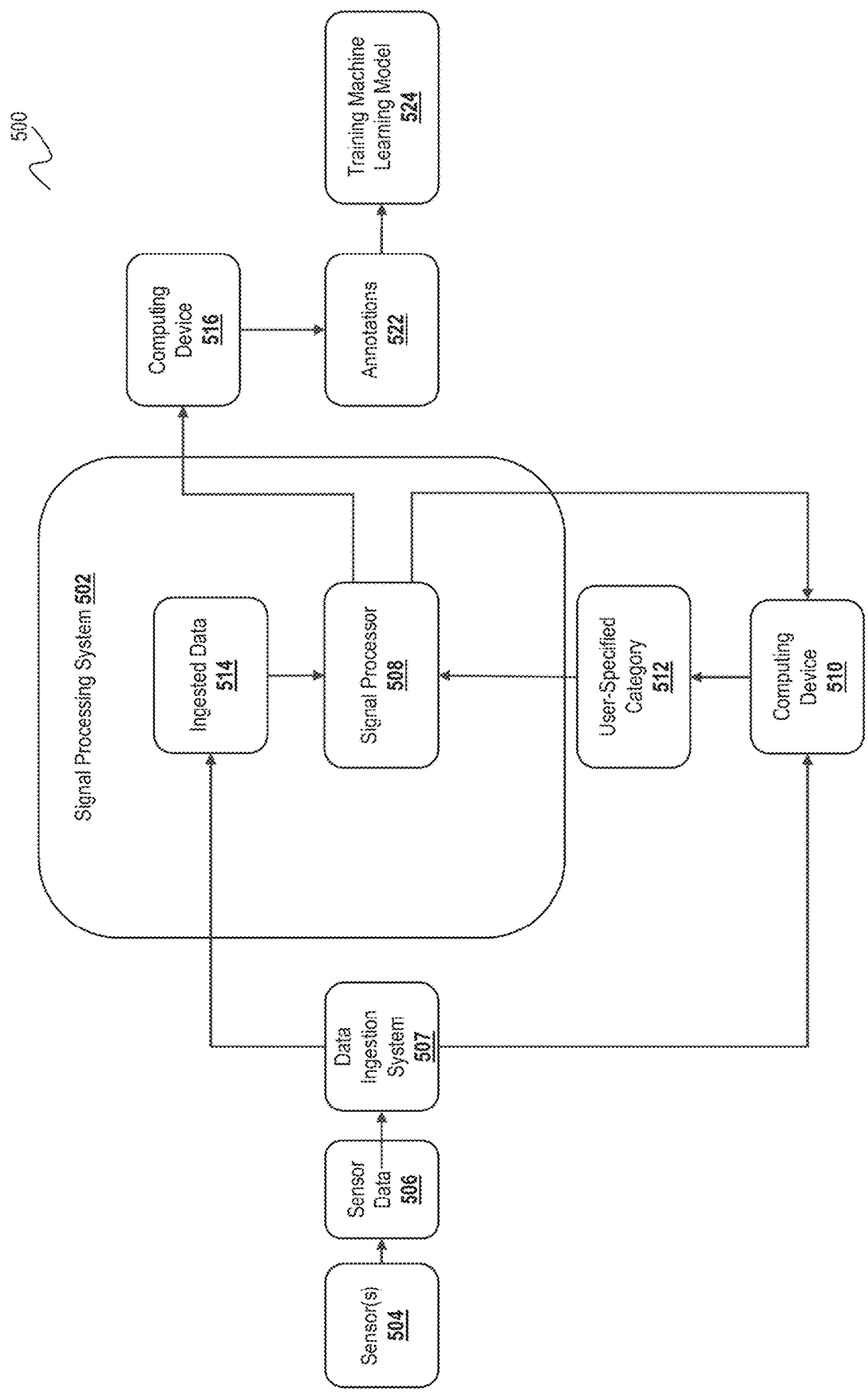
FIG. 5 is a block diagram illustrating an example of a signal processing system.

FIG. 5 is a block diagram illustrating an example of a signal processing environment 500. In the illustrated example, the signal processing environment 500 includes a signal processing system 502 communicatively coupled with a sensor 504, a data ingestion system 507, a computing device 510, a computing device 516, and a training machine learning model 524. In some cases, the signal processing system 502 can receive sensor data from multiple sensors 504. Each of the sensors 504 may provide sensor data tagged with metadata to identify a particular capture session of a plurality of capture sessions. In some cases, the signal processing system 502 may form at least a part of a backend system (e.g., a backend system of the perception system 402, described with reference to FIG. 4) that can receive sensor data and process the sensor data. Each of the plurality of sensors may be associated with (e.g., affixed to, monitoring a feature of, etc.) a vehicle of a fleet of vehicles. The signal processing system 502 can ingest sensor data 506 via a data ingestion system 507 and obtain user-specified categories 512 to filter the sensor data 506. The signal processing system 502 can route the filtered sensor data for generation of annotations 522 by the computing device 516. The computing device 516 can generate the annotations 522 and provide the annotations 522 to train the training machine learning model 524.

The sensor 504 generates sensor data 506 and communicates the sensor data 506 to the data ingestion system 507. The sensor 504 can include any one or any combination of a camera 202a, LiDAR sensor 202b, radar sensor 202c, a location sensor (e.g., a GPS sensor), an accelerometer, a speed sensor, a gyroscope, a position sensor, a weather sensor, a radar sensor, a traffic data sensor, etc. Similarly, the sensor data 506 can include different types of sensor data, such as camera data associated with a camera image, radar data associated with a radar image, LiDAR data associated with a lidar image, location data associated with a location sensor, acceleration data associated with an accelerometer, speed data associated with a speed sensor, orientation data associated with a gyroscope, position data associated with a position sensor, weather data associated with a weather sensor, radar data associated with a radar sensor, traffic data associated with a traffic data sensor, etc. The sensor 504 may generate sensor data 506 based on one or more sensor signal processing settings (e.g., white balance, gain, tint, exposure, color balance, saturation, etc.).

The sensor 504 may capture the sensor data 506 during a plurality of capture data sessions. For example, the sensor 504 may capture a first subset of the sensor data 506 during a first capture data session, a second subset of the sensor data 506 during a second capture data session, a third subset of the sensor data 506 during a third capture data session, etc. Each of the plurality of capture data sessions may be defined by a period of time such as a vehicle trip (e.g., a period of time from a vehicle being turned on to a vehicle being turned off) or any other period of time. The sensor data 506 may include metadata that identifies capture data sessions associated with the sensor data 506. For example, the sensor data 506 may include metadata identifying that the sensor data 506 is associated with a particular sensor, a particular vehicle, a particular vehicle trip, a start and/or stop location of a particular vehicle trip, a distance of one or more vehicle trips, entry of particular navigation commands, sensor and/or vehicle issues (e.g., malfunctions) during a particular vehicle trip, etc. The sensor data 506 captured by the sensor 504 may be grouped into one or more capture sessions and provided to the data ingestion system 504. Therefore, a particular subset of the sensor data 506 may be captured by one or more sensors during the capture data session (e.g., a vehicle trip). For example, the sensor data may be captured by a first sensor and a second sensor affixed to a first vehicle during six vehicle trips and a third sensor affixed to a second vehicle during five vehicle trips.

The data ingestion system 507 can automatically ingest raw log data (e.g., sensor data 506) generated by the sensor 504. In some embodiments, the data ingestion system 507 can automatically ingest the sensor data 506 and process the sensor data 506 (e.g., the data ingestion system 507 can perform pre-processing on the sensor data 506). The data ingestion system 507 may continuously read and process the raw log data and write the ingested data to a data store. The data ingestion system 507 may include a plurality of parallel processes for continuously reading and processing the raw log data and writing the ingested data. The raw log data may include metadata identifying one or more features of the raw log data (e.g., a vehicle associated with the raw log data, a time of capture of the raw log data, a sensor associated with the raw log data, or any other data associated with the vehicle and/or the sensor). In some cases, the data ingestion system 507 may process the raw log data to write the metadata to the raw log data and generated ingested data. Returning to the previous example, the sensor data may be captured by a first sensor and a second sensor affixed to a first vehicle during six vehicle trips and a third sensor affixed to a second vehicle during five vehicle trips. The sensor data may include metadata identifying a time of data capture for the sensor data, a time of each of the vehicle trips, an identifier of each of the sensors, an identifier of each of the vehicles, etc. In some embodiments, the data ingestion system 507 can form at least a part of the signal processing system 502.

In some embodiments, the data ingestion system 507 and/or the signal processing system 502 may obtain the sensor data 506 from a different component. Further, the sensor 504 and/or a different component can perform preliminary signal processing to modify the sensor data 506 prior to the data ingestion system 507 and/or the signal processing system 502 obtaining the sensor data 506.

The data ingestion system 507 may generate and/or provide ingested data 514 associated with the sensor 504 to the signal processing system 502 based on ingesting and/or processing the sensor data 506. In some embodiments, the data ingestion system 507 and the signal processing system 502 may perform a decoupled data ingestion and query process. For example, the data ingestion system 507 may perform data ingestion decoupled from a query performed by the signal processing system 502. The signal processing system 502 (or another related system) may provide instructions to the data ingestion system 507. The instructions may identify how to generate and/or provide the ingested data 514. For example, the instructions may identify rules that define objects, error definitions that define a quality level, and/or any other instructions for generating the ingested data 514.

The computing device 510 (e.g., a third party computing device) may also receive the ingested data 514 from the data ingestion system 507. In some embodiments, the computing device 510 may receive the sensor data 506.

The signal processing system 502 includes a signal processor 508 to mine the ingested data 514. The signal processing system 502 may also include a plurality of machine learning models (e.g., a plurality of neural networks). The signal processor 508 may utilize the plurality of machine learning models to process the ingested data 514. The signal processor 508 may be an extensible system and the signal processor 508 may expand and/or contract the plurality of machine learning models. The signal processor 508 may initiate (e.g., provide) additional machine learning models to process the ingested data 514. For example, the signal processor 508 may utilize the plurality of machine learning models to process the ingested data 514 to identify a plurality of features of the ingested data 514. The signal processor 508 may determine that the plurality of machine learning models do not identify a particular feature (e.g., planes in the sky). In some cases, the signal processor 508 may filter the sensor data to identify uncategorized (e.g., unclassified) sensor data (e.g., sensor data that has not been classified by the plurality of machine learning models and/or has been classified by a generic machine learning model but not a specific machine learning model). Based on identifying that the plurality of machine learning models do not identify a particular feature and/or that a portion of sensor data has not been classified, the signal processor 508 can initiate a new machine learning model to process the sensor data. It will be understood that the signal processor may initiate any number of machine learning models.

Each of the plurality of machine learning models may identify whether the sensor data conforms to a particular category of capture session. For example, each machine learning model may process the ingested data 514 and determine whether the ingested data 514 conforms to a category of capture session corresponding to the particular machine learning model.

The category of capture session may include sensor data that includes objects and/or classes of objects that appear in less than a threshold amount of sensor data (e.g., the sensor data 506 or different sensor data). For example, the category of capture session may include sensor data that identifies a particular rare class of object (e.g., a bicycle, an ice cream truck, a person with a walking cane).

The category of capture session may include sensor data that identifies an object, a class of object, a scene, an image, etc. for which the classification by the training machine learning model 524 (or a different machine learning model) matched a set of ground truth data less than a threshold value (e.g., the training machine learning model 524 correctly classified the object, the class of object, the scene, the image, etc. less than a threshold value). The category of capture session may include sensor data that identifies an object, a class of object, a scene, or an image that the training machine learning model 524 classified that did not match a set of ground truth data (e.g., annotations provided by computing device 516). For example, the training machine learning model 524 classified a walking pedestrian as a vehicle. The plurality of machine learning models may receive data identifying one or more objects, classes of object, scenes, images, etc. for which the classification by the training machine learning model 524 matched a set of ground truth data less than a threshold value and may define a category of capture session based on the received data.

The category of capture session may include sensor data that identifies particular environmental characteristics. For example, the category of capture session may include sensor data that identifies a particular weather condition (e.g., snowing, raining, etc.). In some embodiments, the category of capture session may include sensor data that identifies environmental characteristics that occur in less than a threshold amount of vehicle trips (e.g., snowing).

The category of capture session may include sensor data that identifies particular maneuvers of an object (e.g., the vehicle, a different vehicle, a pedestrian, an animal, etc.). For example, the category of capture session may include sensor data that identifies a maneuver of the vehicle (e.g., the vehicle moving faster or slower than a particular threshold value, the vehicle executing particular classified maneuvers such as a lane change or an unprotected left turn, etc.), a maneuver of a pedestrian (e.g., a pedestrian entering a crosswalk, a pedestrian walking in the road, etc.), a maneuver of a different vehicle (e.g., the brakes of a vehicle leading the vehicle are initiated), a maneuver of an animal (e.g., an animal entering the road), etc.

Each of the plurality of machine learning models may be trained to identify sensor data related to a particular category of capture session. For example, a first machine learning model may identify sensor data that identifies a vehicle travelling at a particular speed and a second machine learning model may identify sensor data that identifies a pedestrian.

Each of the categories of capture session may not be exclusive to a particular object, a particular class of object, a particular image, a particular scene, a particular sensor, a particular vehicle, a particular sensor data capture session, and/or a particular vehicle trip. Each category of capture session may include multiple objects, multiple classes of objects, multiple images, multiple scenes, data from multiple sensors, data associated with multiple vehicles, data associated with multiple sensor data capture session, and/or data associated with multiple vehicle trips.

The plurality of machine learning models may identify categories of capture session for training the training machine learning model 524. For example, the plurality of machine learning models may identify a portion of sensor data and tag the portion of sensor data as including a crosswalk. Based on a user-specified category, the portion of sensor data tagged as including a cross walk may be provided to the training machine learning model 524 for training. In some cases, the plurality of machine learning models may include the training machine learning model. The plurality of machine learning models may identify and tag a particular portion of sensor data (e.g., as including a bike) with a threshold confidence value. The portion of sensor data may be annotated and the annotated sensor data may be used to update the training machine learning model 524.

Using the plurality of machine learning models, the signal processor 508 can process the ingested data 514. The signal processor 508 can provide the ingested data 514 to each of the plurality of machine learning models. Each machine learning model may identify, from the ingested data 514, whether one or more sensor data capture sessions and/or one or more portions of sensor data capture sessions conforms to a particular category of capture session. The signal processor 508 can identify a plurality of capture session collections represented in the sensor data using the plurality of machine learning models. Each of the plurality of capture session collections may represent sensor data of the one or more sensor data capture sessions that conforms to a particular category of capture session. Therefore, the signal processor 508 can identify a plurality of capture session collections represented in the ingested data 514 and each capture session collection may conform to a particular category of capture session.

Returning to the previous example, the signal processor 508 may identify capture session collections represented in the ingested data 514. The capture session collections may include a first category of capture session including sensor data identifying a dog, a second category of capture session including sensor data identifying a vehicle traveling over 50 miles per hour, a third category of capture session including sensor data identifying a pedestrian in a crosswalk, a fourth category of capture session including sensor data identifying a bicycle in the road, etc. The capture session collections may also include categories of capture session based on metadata from the ingested data including a first category of capture session including sensor data captured between 5:00 PM and 5:00 AM, a second category of capture session including sensor data associated with a particular vehicle, etc.

The signal processor 508 can write metadata identifying the categories of capture session corresponding to each portion of the ingested data 514. For example, if a machine learning model identifies that a portion of the ingested data 514 corresponds to a first category of capture session corresponding to sensor data identifying bicycles and a second category of capture session corresponding to sensor data identifying a vehicle traveling over 50 miles per hour, the signal processor 508 can write metadata identifying and the first and second categories of capture session to the portion of ingested data 514. Each portion of the ingested data 514 may correspond to one or more categories of capture session. In some cases, a portion of the ingested data 514 may not correspond to a category of capture session.

The signal processor 508 can provide the categories of capture session to the computing device 510. Further, the signal processor 508 may generate a user interface that identifies the categories of capture session. In some cases, the signal processor 508 may provide one or more features of the ingested data 514 for selection via the user interface. For example, the one or more features of the ingested data 514 may include a vehicle associated with the raw log data associated with the ingested data 514, a time of capture of the raw log data, a sensor associated with the raw log data, or any other data associated with the vehicle and/or the sensor. The signal processor 508 may cause the computing device 510 to display the user interface. The computing device may receive the ingested data 514 from the data ingestion system 507 and may display at least a portion of the ingested data 514 in the user interface.

The user interface may include one or more selectable parameters to enable a user to select a particular category. For example, the categories of capture session may be displayed, via the user interface, as one or more selectable filters. Returning to the previous example, the user interface may identify a first category of capture session including sensor data identifying a dog, a second category of capture session including sensor data identifying a vehicle traveling over 50 miles per hour, a third category of capture session including sensor data identifying a pedestrian in a crosswalk, a fourth category of capture session including sensor data identifying a bicycle in the road, a fifth category of capture session including sensor data captured between 5:00 PM and 5:00 AM, a sixth category of capture session including sensor data associated with a particular vehicle, etc.

The user can select a particular category using the one or more selectable parameters. Based on the selection, the computing device 510 can identify a user-specified category 512 of the categories of capture session. The computing device 510 can provide the user-specified category 512 to the signal processing system 502. Returning to the previous example, a user may request training of the training machine learning model 524 to identify objects at night when traveling at a certain speed. For example, the user-specified category may include a second category of capture session including sensor data identifying a vehicle traveling over 50 miles per hour and a fifth category of capture session including sensor data captured between 5:00 PM and 5:00 AM.

The signal processor 508 of the signal processing system 502 can receive the user-specified category 512 from the computing device 510. In some cases, the user-specified category 512 may identify one or more categories of capture session. For example, the user-specified category 512 may include a first category of capture session including pedestrians in a crosswalk and a second category of capture session including a vehicle travelling over 50 miles per hour. In some cases, the user-specified category 512 may identify one or more features of the ingested data 514. For example, the user-specified category 512 may include a first category of capture session including pedestrians in a crosswalk and a first feature of ingested data 514 including sensor data captured between 5:00 PM and 5:00 AM.

The signal processor 508 can filter the ingested data 514 using the user-specified category 512. For example, the signal processor 508 may identify, based on the user-specified category 512, a capture session collection that represents a portion of the ingested data 514 that conforms to the user-specified category 512. In some embodiments, the signal processor 508 can filter a set of ingested data different from the ingested data 514 (e.g., a different set of sensor data) using the user-specified category 512. The user-specified category 512 may identify the portion of the ingested data 514 and the signal processor 508 may identify that the capture session collection represents the portion of the ingested data 514 identified by the user-specified category. The portion of the ingested data 514 may include sensor data captured across a plurality of sensor data capture sessions. Returning to the previous example, the portion of the ingested data 514 may include sensor data associated with a vehicle traveling over 50 miles per hour and captured between 5:00 PM and 5:00 AM. Therefore, the signal processor 508 can identify the portion of the ingested data 514.

The signal processor 508 can transmit the portion of the ingested data 514 to the computing device 516. For example, the computing device 516 may be an end user computing device and the signal processor 508 may transmit the portion of the ingested data 514 to the end user computing device. The signal processor 508 can also transmit instructions to the computing device 516 instructing the computing device 516 to generate annotations for the portion of the ingested data 514. The signal processing system 502 (or another related system) may provide instructions to the computing device 516. The instructions may identify how to generate the annotations 522. For example, the instructions may include annotation rules that define objects for annotation and a manner of annotation (e.g., the annotation rules may define a format or style of the annotation), error definitions that define annotation errors and a desired quality level, and/or any other instructions for generating the annotations 522.

Based on the instructions from the signal processing system 502 and the portion of the ingested data 514, the computing device 516 may generate annotations 522 for the signal processing system 502. For example, a user may use the computing device 516 to generate the annotations 522 by annotating the portion of the ingested data 514. The annotations 522 may include annotated sensor data. Further, the annotations 522 may include one or more identifiers of objects in an image of an area captured by the portion of the ingested data 514. For example, the annotations 522 may identify a first object in the image of the area captured by portion of the ingested data 514 as a "dog," a second object as a "vehicle," a third object as a "building," etc. It will be understood that the annotations 522 may include more, less, or different annotations (e.g., identifiers, labels, lidar segmentation labels, etc.).

The annotations 522 may identify a particular object and an annotation for the object. For example, the annotations 522 may include a plurality of field-value pairs for each object that identifies an identifier of the object (e.g., coordinates of the object) and an annotation of the object. Further, the annotations 522 may be formatted in an in-memory database format or a main-memory database format.

In some cases, the computing device 516 may include a network for generating the annotations 522. Therefore, the signal processor 508 can identify a portion of ingested data 514 for annotation and the computing device 516 can automatically annotate the portion of ingested data 514 without manual intervention and provide the annotated data for training of the training machine learning model 524. For example, the computing device 516 may be a portion of the signal processing system 502. The computing device 516 can be implemented using one or more networks (e.g. one or more CNNs). For example, the computing device 516 can be implemented using an image semantic network and/or a lidar semantic network. The computing device 516 can receive the portion of the ingested data 514 as input and output a semantic image and/or semantic data associated with the semantic image.

The computing device 516 can include an image feature extraction network. In certain cases, the image feature extraction network can be implemented using the DeepLabv3+ or PSP+ neural network models. However, it will be understood that a variety of neural networks can be used to extract features from an image. In some cases, the computing device 516 may correspond to camera images, however, it will be understood that various types of images can be used as an input for the image feature extraction network.

As described herein, the image feature extraction network can include one or more filters, convolution layers, subsampling layers, and/or fully connected layers that can be used to identify and classify different objects in the computing device 516 (e.g., vehicle, pedestrian, bicycle, barrier, traffic cone, drivable surface, or a background, etc.). Accordingly, in certain cases, the semantic data output by the image feature extraction network can identify one or more objects in the portion of the ingested data 514 and the object classification for the respective objects.

The semantic image can include rows of pixels. Some or all pixels in the semantic image can include semantic data, such as one or more feature embeddings. In certain cases, the feature embeddings can relate to one or more object attributes, such as but not limited to an object classification or class label identifying an object's classification (sometimes referred to as an object's class) (non-limiting examples: vehicle, pedestrian, bicycle, barrier, traffic cone, drivable surface, or a background, etc.). The object classification can include a probability value that indicates the probability that the identified object classification for a pixel is correctly predicted.

The computing device 516 may further include a 3D bounding box network. The 3D bounding box network can be implemented using one or more CNNs that can be configured to receive the portion of ingested data 514 as input and output feature data associated with one or more features extracted from the image, which may also be referred to herein as 3D feature data and/or 3D semantic data, and/or output an annotated image that includes the portion of ingested data 514 and feature data associated with the one or more features extracted from the image.

As described herein, the 3D bounding box network can include one or more filters, convolution layers, subsampling layers, and/or fully connected layers that can be used to detect dimensions of objects in an image, such as, but not limited to the width, height, and/or length of the object in the image. The 3D bounding box network can also determine or estimate mobility parameters of the object, such as, but not limited to the object's orientation, 3D location, movement, velocity, trajectory, etc. The 3D bounding box network generates 3D bounding boxes for the object indicating the dimensions and/or mobility parameters of the object.

Some or all of the pixels in the annotated image can include additional data. For example, a pixel in the annotated image can include image data associated with at least one type of image (e.g., the image data of at least one of the images used to create the image), image semantic data associated with the image (e.g., the semantic data generated by the image feature extraction network, such as the object's classification), and 3D feature data associated with a feature of the object (e.g., the feature data generated by the 3D bounding box network). For example, a pixel in the annotated image can include one or more annotations for location (x, y, z), reflectance, intensity, time stamp, different object class probabilities, associated bounding box, trajectory prediction, movement, velocity estimation, etc. Therefore, the computing device 516 can determine annotations via the annotated image for the portion of ingested data 514.

The computing device 516 can route the annotations 522 to the training machine learning model 524 for training the training machine learning model 524. For example, the training machine learning model 524 may be trained to generate an output based on the annotations 522.

It will be understood that the signal processing system 502 can include fewer, more, or different components. For example, the signal processing system 502 can include multiple signal processors 508 performing different processing function on the sensor data 506 and/or processing sensor data 506 from different sensors 504.

Example Operating Diagram of Signal Processor

Figure 6:
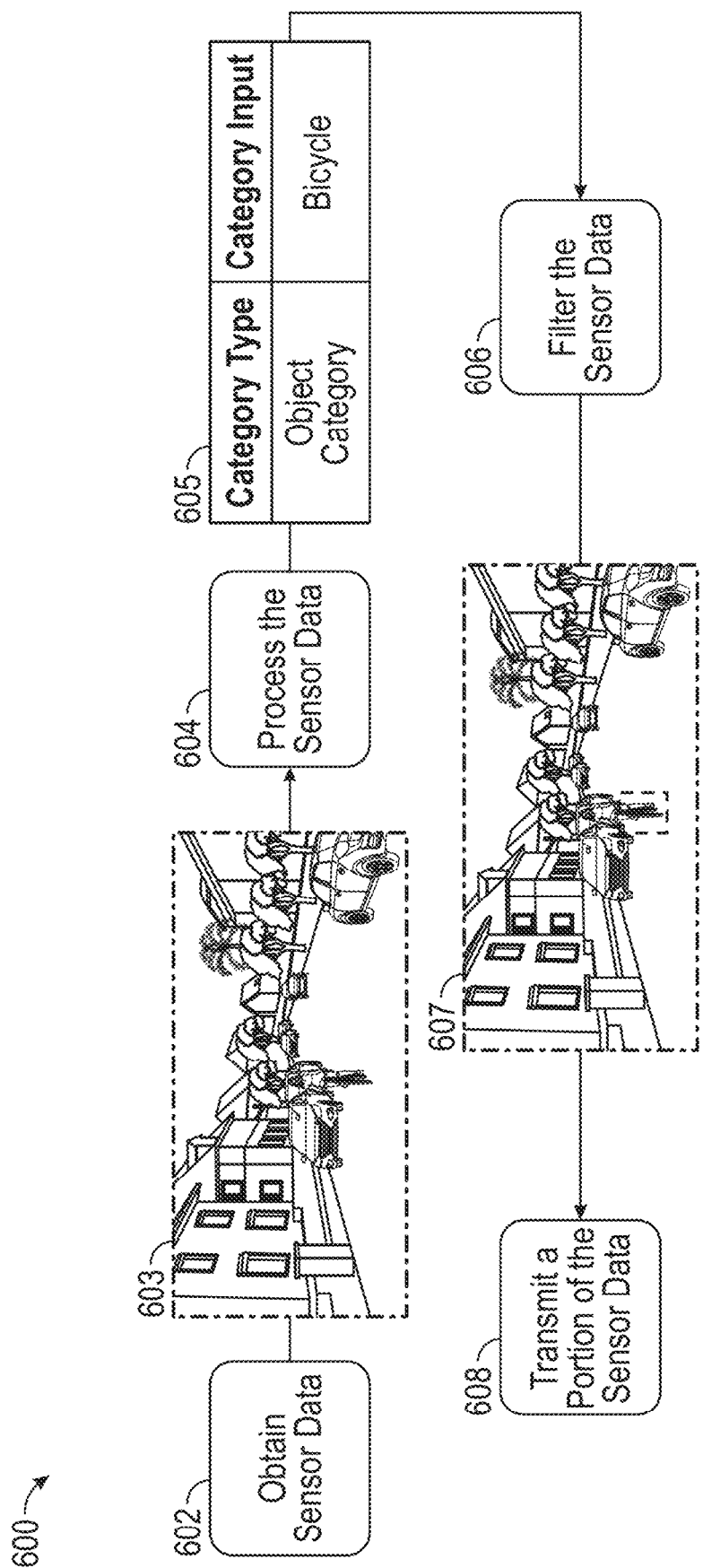
FIG. 6 is a flow diagram illustrating an example sensor data processing operation.

FIG. 6 is an operation diagram illustrating a data flow for obtaining and processing sensor data to identify categories of capture session. The data flow further is directed subsequently to filtering sensor data based on a user-specified category of the categories of capture session. Specifically, FIG. 6 is an operation diagrams illustrating a data flow for filtering sensor data that has been tagged using a plurality of a machine learning models that each mine the sensor data. The sensor data may be filtered using a user-specified category to identify a subset of sensor data. Any component of the perception system 402 can facilitate the data flow for obtaining and processing sensor data to identify categories of capture session and subsequently filtering sensor data based on a user-specified category of the categories of capture session. In some embodiments, a different component can facilitate the data flow. In the example of FIG. 6, a signal processing system facilitates the data flow.

At step 602, the signal processing system receives sensor data (e.g., image data) associated with a camera image 603. In the illustrated example, a camera image 603 is used, however, it will be understood that different types of images or sensor data can be used. As described herein, the camera image 603 can correspond to an image in a database that was generated from sensor data obtained from a camera, such as cameras 202a. In some cases, the camera image 603 can include multiple rows of pixels in a matrix, and each pixel can include a value for red, green, and blue or a grayscale value. In some embodiments, the camera image 603 may include preliminary annotations. In other embodiments, the camera image 603 does not include annotations and/or may be referred to as an unannotated camera image 603.

The camera image 603 may include a single image, a plurality of images (e.g., a stream of images, one or more images and associated data (e.g., telemetry data), etc. For example, the camera image 603 may be associated with a vehicle being turned off and may include a sequence of images associated with the vehicle being turned off, engine sensor data, brake sensor data, lock sensor data, etc.

The sensor data may be generated and/or collected over a plurality of sensor data capture sessions. For example, the sensor data may be generated over a plurality of vehicle trips. A particular portion of the sensor data may be generated during a particular sensor data capture session. Further, the particular portion of the sensor data may be generated during the particular sensor data capture session by at least one sensor affixed to and/or associated with one or more vehicles during a vehicle trip.

The sensor data may be automatically ingested by the signal processing system. For example, the sensor data may be automatically ingested by a data ingestion system of the signal processing system. In some cases, the sensor data may be continuously ingested by the signal processing system.

At step 604, the signal processing system processes the sensor data. For example, the signal processing system may continuously process the sensor data. The signal processing system may implement a series of mining scripts to process the sensor data. For example, the signal processing system may include a plurality of machine learning models for processing the sensor data. Each of the plurality of machine learning models can identify, for the sensor data, a particular portion of sensor data that conforms to a particular category of capture session. Each of the plurality of machine learning models can identify whether the sensor data conforms to a different category of capture session. Each portion of sensor data may conform to zero, one, or multiple categories of capture session. For example, particular portions of sensor data may not conform to any of the categories of capture session. Further, a portion of sensor data may conform to a first category of capture session as identified by a first machine learning model and a second category of capture session as identified by a second machine learning model.

Each machine learning model may tag the sensor data with metadata identifying the category(ies) of capture session associated with the sensor data. For example, a portion of sensor data may be tagged to identify that the portion of sensor data identifies a person in a crosswalk.

A category of capture session may identify a maneuver of an object. For example, the category of capture session may identify a speed, an acceleration, a jerk, a steering angle, a pose, an orientation, a location, a position, a trajectory, or any other data associated with a vehicle, a pedestrian, or any other object.

Further, a category of capture session may identify how the sensor data relates to previously obtained sensor data. For example, the category of capture session may, via spatio-temporal filtering, identify sensor data that identifies the same image and/or scene (e.g., an identical, a near-identical, or a semi-identical image or scene) as other sensor data. In some embodiments, the category of capture session may identify sensor data that exceeds a threshold value of similarity with other sensor data via image comparison. Further, the category of capture session may identify previously annotated sensor data.

A category of capture session may identify sensor data that exceeds, satisfies, etc. a threshold value or range of machine learning model uncertainty. For example, the category of capture session may identify sensor data that exceeds a particular threshold value of uncertainty. Further, the category of capture session may identify sensor data that includes a data anomaly. For example, the category of capture session may identify sensor data that includes a particular object or class of object.

A category of capture session may identify sensor data that includes particular environmental characteristics. For example, the category of capture session may identify sensor data that identifies a sun glare, a flicker, a weather (e.g., raining, snowing, etc.), a number of objects in a scene (e.g., a crowded scene), etc.

A category of capture session may further identify features of the sensor data (e.g., received as metadata of the sensor data). For example, a category of capture session may identify a time of day, a location, a distance, a destination, a source, a route, calibration data associated with a sensor and/or the vehicle, automatic and/or manual data associated with a transmission of a vehicle, malfunction data associated with a sensor, a component of a vehicle, or the vehicle, or any other data associated with a sensor and/or the vehicle.

The signal processing system may identify a plurality of capture session collections represented in the sensor data. Each capture session collection may represent a collection of sensor data collected over a single or multiple sensor data capture sessions. For example, a capture session collection may represent a collection of sensor data collected over a first and a second sensor data capture session. Each capture session collection may represent a collection of sensor data collected over any number of sensor data capture sessions. Further, each capture session collection may represent a collection of sensor data that conforms (e.g., satisfies, fulfills, etc.) to a particular category of capture session. Therefore, the signal processing system can identify the plurality of capture session collections.

The signal processing system therefore obtains and processes the sensor data. The signal processing system may obtain and process the sensor data to identify the plurality of capture session collections during a first time period.

Subsequent to the first time period, the signal processing system can generate a user interface that identifies the categories of capture session represented by the plurality of capture session collections. The user interface may include the categories of capture session as selectable parameters. The signal processing system can cause display of the user interface at a user computing device.

In response to causing display of the user interface at the user computing device and during a second time period after the first time period, the signal processing system can obtain a selection of a user-specified category 605 from the user computing device. The user-specified category 605 may identify a category type and a category input. For example, the user-specified category 605 may identify a type of category of capture session and a specific input for the type of category of capture session. Based on the category type and the category input, the signal processing system can identify a particular category of capture session. In some cases, a user computing device can provide multiple user-specified categories. In the example of FIG. 6, the user-specified category 605 identifies a category type of "object category" and a category input of "bicycle." Therefore, the signal processing system can identify that the user-specified category identifies sensor data that includes a particular object (e.g., a bicycle).

At step 606, the signal processing system filters the sensor data. The signal processing system can filter the sensor data based on the user-specified category 605. The signal processing system may filter the sensor data by identifying a portion of sensor data that has been tagged with metadata associated with the user-specified category 605. For example, the signal processing system may identify sensor data that includes a tag identifying the sensor data includes a bicycle. The signal processing system may use the user-specified category to identify a capture session collection that represents sensor data of one or more sensor data capture sessions. The identified capture session collection may include filtered sensor data that conforms to the user-specified category 605.

In the example of FIG. 6, the signal processing system filters the sensor data to identify a portion of sensor data that is associated with an image 607 represented by a capture session collection. The capture session collection may represent sensor data that is associated with an image 607 that identifies a bicycle.

At step 608, the signal processing system transmits the portion of the sensor data associated with the image 607 to a user computing device. The signal processing system may transmit the portion of the sensor data for display via a user interface. In some embodiments, the signal processing system may transmit the portion of the sensor data for annotation.

The signal processing system may transmit the portion of the sensor data to a computing device (e.g., a third party computing device associated with a user that provides annotations via the third party computing device). The computing device may generate annotated sensor data. The annotated sensor data may include a plurality of annotations.

In some embodiments, the signal processing system may generate the annotated sensor data. The signal processing system may generate the annotated sensor data using a machine learning model (e.g., a network). For example, the machine learning model may include an image semantic network, a lidar semantic network, etc. In order to generate the annotated sensor data, the signal processing system may provide the image 607 to the machine learning model.

The annotated sensor data may include a plurality of object identifiers and a plurality of corresponding annotations. For example, the object identifiers may be coordinates etc. that point to a particular subset of the annotated sensor data (e.g., pixels of an image that are identified as being associated with a pedestrian). Further, the annotated sensor data may identify a width, height, and length of an object, bounding boxes for an object, object movement, object orientation, object trajectory, or other object attributes.

Each of the object identifiers may be associated with or linked to a particular annotation (e.g., identifier, label, etc.). For example, a particular object may be identified by an object identifier (e.g., a pointer to a portion of the image) and an annotation (e.g., a label identifying the object as corresponding to a pedestrian).

The signal processing system (or the computing device) may route the annotated sensor data to a machine learning model as training data for training of the machine learning model. For example, the signal processing system can cause the machine learning model to be trained using the training data.

As described herein, the data mining process and the subsequent data filtering process can be repeated thousands, hundreds of thousands, millions, or more times in order to continuously mine sensor data. By filtering the sensor data using a user-specified category 605 (e.g., provided by a user computing device), the signal processing system can identify a specific portion of sensor data for annotation and for training of the machine learning model. These additional features can enable the signal processing system to accurately and efficiently train a machine learning model using annotated sensor data.

In addition, during the verification process, some of the functions or elements described herein may not be used or may not be present. For example, the signal processing system may not transmit the portion of the sensor data and the signal processing system may perform the annotation of the filtered sensor data.

Example User Interfaces

Figure 7:
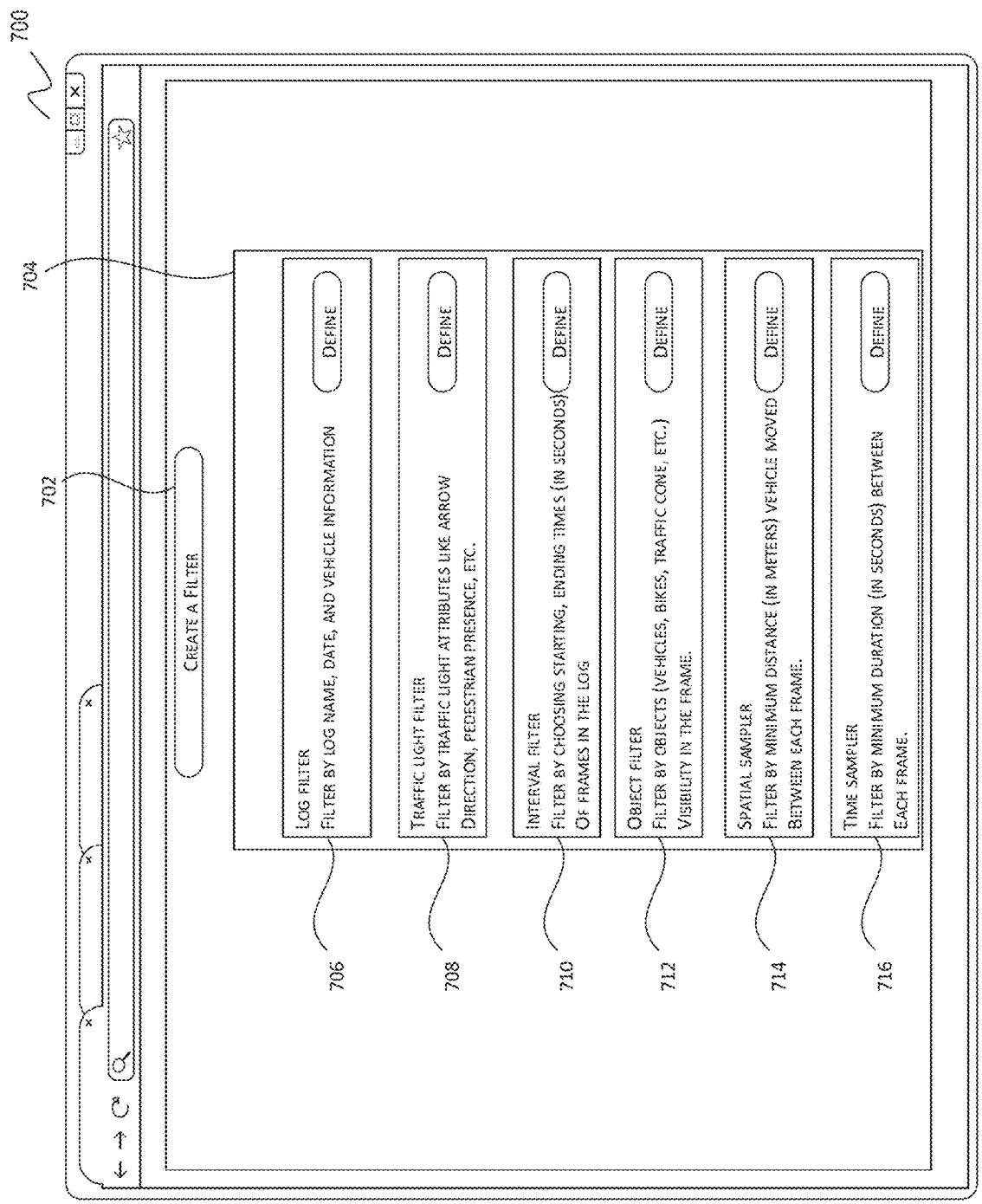
FIG. 7 is an example user interface illustrating example filters.

FIG. 7 illustrates an example interface 700 showing various exemplary features in accordance with one or more embodiments. The example interface 700 may include one or more selectable parameters to enable a user to select a particular filter for sensor data. In the illustrated embodiment of FIG. 7, the interface 700 includes a first selectable parameter (e.g., a custom filter generation section 702) and a second section of selectable parameters (e.g., a filter selection section 704). It will be understood that the interface 700 may include, more, less, or different elements. The interface 700 may be an exemplary display for displaying filters corresponding to categories of capture session. The example interface 700 is illustrative of an interface that a computing system (e.g., a server in communication with the signal processing system) generates and presents to a user in response to the user requesting to filter sensor data. The example interface 700 may be available to a user to filter the sensor data for annotation. The interface 700 may be generated in response to an interaction by the user with a prior interface. For example, the user may interact with a particular element on a prior interface to initiate the filter selection process.

As a non-limiting example, one or more elements of the user interface 700 can be used to enable a user to define a particular filter for the sensor data. In response to a selection of a particular filter, the signal processing system can filter the sensor data and provide the sensor data for annotation. For example, the signal processing system can obtain a selection of a particular filter and filter the sensor data to identify sensor data associated with a particular category of capture session. The user interface 700 may include the custom filter generation section 702 and the filter selection section 704 to enable a user to select a particular filter.

The custom filter generation section 702 may be interactive such that a user can interact with the custom filter generation section 702. By interacting with the custom filter generation section 702, the user interface 700 may update to provide an updated user interface. The updated user interface may identify a plurality of category types and a plurality of category inputs. For example, the updated user interface may identify a plurality of category types including metadata related categories, vehicle related categories, sensor data similarity related categories, environmental characteristic categories, pedestrian related categories, machine learning model related categories, etc.

Each category type may have one or more potential category inputs. For example, the metadata related categories can include location, distance, period of time for travel, route, source, destination, automatic and/or manual data associated with a vehicle transmission, etc. The vehicle related categories can include vehicle velocity, acceleration, jerk, steering angle, pose, orientation, maneuvers, etc. The sensor data similarity related categories can include a threshold similarity to prior processed or annotated images. The environmental characteristic categories can include a time of day, weather, glare, flicker, etc. The pedestrian related categories can include a location of a pedestrian, a maneuver of a pedestrian, etc. The machine learning model related categories can include a machine learning model uncertainty (e.g., entropy) for particular sensor data.

By interacting with the updated user interface, the user can provide a filter for filtering the sensor data. Further, the updated user interface enables a user to provide a custom filter definition.

The filter selection section 704 may be interactive such that a user can interact with the filter selection section 704. By interacting with the filter selection section 704, the user may select a particular category type. Further, by interacting with the filter selection section 704, the user can define a particular category input for a particular category type. For example, each filter may be associated with an element that enables a user to define a category input for the particular filter. The filter selection section 704 may identify a plurality of filters and each filter may be associated with a different category type.

In the example of FIG. 7, the filter selection section 704 includes a first filter 706, a second filter 708, a third filter 710, a fourth filter 712, a fifth filter 714, and a sixth filter 716. It will be understood that the filter selection section 704 may identify more, less, or different filters.

The first filter 706 of the filter selection section 704 identifies a "log filter." The log filter can enable a user to filter sensor data by log name, date, vehicle data associated with a vehicle, etc. Further, the log filter may enable a user to identify a specific portion of log data associated with a data store for filtering (e.g., log data associated with a vehicle, a date, or a log).

The second filter 708 of the filter selection section 704 identifies a "traffic light filter." The traffic light filter can enable a user to filter sensor data by the presence of traffic light attributes (e.g., an arrow direction of a traffic light, a pedestrian present at a traffic light, etc.).

The third filter 710 of the filter selection section 704 identifies an "interval filter." The interval filter can enable a user to filter sensor data by a particular time (e.g., filter the sensor data by selecting a start time and/or end time of frames in the sensor data).

The fourth filter 712 of the filter selection section 704 identifies an "object filter." The object filter can enable a user to filter sensor data by the presence of an object in the sensor data (e.g., the presence of a vehicle, a bike, a traffic cone, etc. that is visible in a particular frame of the sensor data).

The fifth filter 714 of the filter selection section 704 identifies a "spatial sampler." The spatial sampler can enable a user to filter sensor data by spatial data associated with a frame (e.g., a minimum distance moved by a vehicle between each frame of the sensor data).

The sixth filter 716 of the filter selection section 704 identifies a "time sampler." The time sampler can enable a user to filter sensor data by a period of time (e.g., a minimum duration of time between frames of the sensor data). Therefore, the user interface 700 can enable a user to provide a custom filter definition for filtering sensor data.

Figure 8:
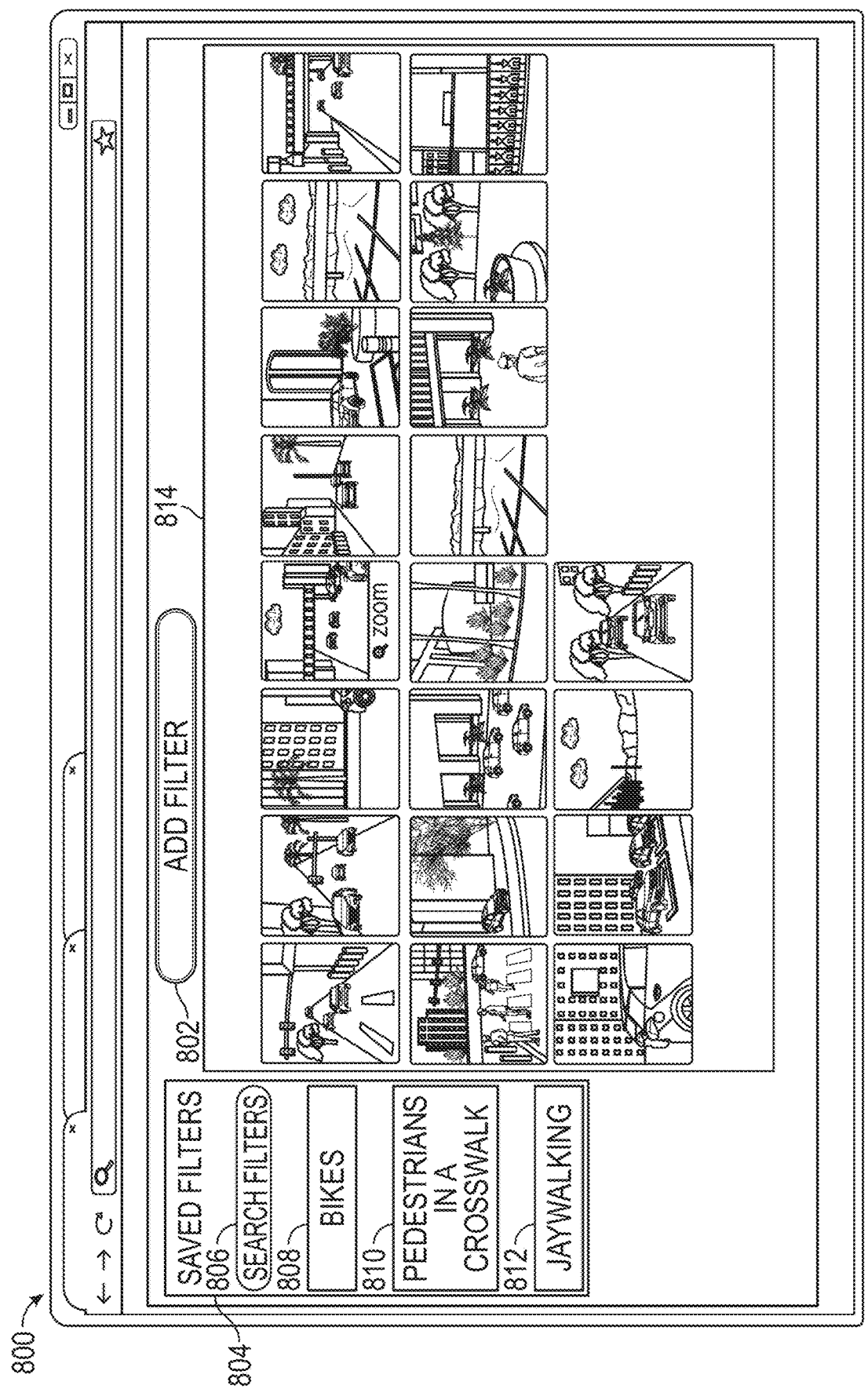
FIG. 8 is an example user interface illustrating visualizations of sensor data for filtering.

FIG. 8 illustrates an example interface 800 showing various exemplary features in accordance with one or more embodiments. The example interface 800 may include one or more selectable parameters to enable a user to select a particular filter for sensor data. The example interface 800 may further include a visual representation of ingested sensor data (e.g., an image). In the illustrated embodiment of FIG. 8, the interface 700 includes a first selectable parameter (e.g., a custom filter generation section 802), a second section of selectable parameters (e.g., a filter selection section 804), and a visual representation section 814. It will be understood that the interface 800 may include, more, less, or different elements. The interface 800 may be an exemplary display for displaying filters corresponding to categories of capture session. The example interface 800 is illustrative of an interface that a computing system (e.g., a server in communication with the signal processing system) generates and presents to a user in response to the user requesting to filter ingested sensor data. The example interface 800 may be available to a user to filter the sensor data for annotation. The interface 800 may be generated in response to an interaction by the user with a prior interface. For example, the user may interact with a particular element on a prior interface to initiate the filter selection process.

As a non-limiting example, one or more elements of the user interface 800 can be used to enable a user to define a particular filter for the sensor data. For example, a user can interact with the custom filter generation section 802 and/or the filter selection section 804. In response to a selection of a particular filter, the signal processing system can filter the sensor data and provide the sensor data via the visual representation section 814. In some cases, the user interface 800 may display the sensor data prior to filtering the sensor data and may update the visual representation section 814 based on filtering the sensor data.

As discussed above, the custom filter generation section 802 may be interactive such that a user can interact with the custom filter generation section 802. By interacting with the custom filter generation section 802, the user interface 800 may update to provide an updated user interface. The updated user interface may identify a plurality of category types and a plurality of category inputs. By interacting with the updated user interface, the user can provide a filter for filtering the sensor data. Further, the updated user interface enables a user to provide a custom filter definition.

Additionally, the filter selection section 804 may be interactive such that a user can interact with the filter selection section 804. By interacting with the filter selection section 804, the user may select a previously defined (e.g., saved) filter. For example, the filter may be defined using the custom filter generation section 802 and/or the user interface 700. The filter selection section 804 may identify a plurality of filters each corresponding to a particular category of session capture.

In the example of FIG. 8, the filter selection section 804 includes a search filter element 806. The search filter element 806 may enable users to provide a search query and the system may identify a particular filter in response to the search query. The user interface 800 may display the identified filter in response to the search query. The filter selection section 804 may further include a first filter 808, a second filter 810, and a third filter 812. It will be understood that the filter selection section 804 may identify more, less, or different filters. The first filter 808 may be a bike filter (e.g., a filter to identify sensor data that identifies bicycles in frame). The second filter 810 may be a pedestrians in a crosswalk filter (e.g., a filter to identify sensor data that identifies pedestrians in a crosswalk in frame). The third filter 812 may be a jaywalking filter (e.g., a filter to identify sensor data that identifies pedestrians jaywalking in a frame).

Example Flow Diagram of Signal Processor

FIG. 9 is a flow diagram illustrating an example of a routine 900 implemented by one or more processors (e.g., one or more processors of the signal processing system 502). The flow diagram illustrated in FIG. 9 is provided for illustrative purposes only. It will be understood that one or more of the steps of the routine illustrated in FIG. 9 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

To provide sensor data associated with at least one sensor for annotation, the signal processing system 502, at block 902, receives sensor data. A plurality of sensors (e.g., sensors associated with a vehicle) may capture the sensor data during a plurality of sensor data capture sessions. For example, the sensor data may include first sensor data captured by a first sensor associated with a vehicle during a plurality of sensor data capture sessions and second sensor data captured by a second sensor associated with the vehicle during the plurality of sensor data capture sessions. Each sensor data capture session may correspond to data captured by one or more sensors over a period of time (e.g., a vehicle trip). For example, each sensor data capture session may correspond to a sequence of sensor data associated with a particular vehicle trip.

The sensor data may include camera data associated with a camera image, radar data associated with a radar image, LiDAR data associated with a lidar image, and/or any other sensor data. Further, the sensor(s) that capture the sensor data may include a camera image sensor, a LiDAR sensor, a radar sensor, or any other sensors.

The sensor data may include metadata identifying one or more features of the sensor data (e.g., a vehicle associated with the sensor data, a time of capture of the sensor data, a sensor associated with the sensor data, or any other data associated with the vehicle and/or the sensor).

In some cases, the sensor data may be processed by a data ingestion system prior to the signal processing system 502 receiving the sensor data. The data ingestion system may process the sensor data and store the sensor data in a data store and the signal processing system 502 may receive the sensor data from the data store. Therefore, the signal processing system 502 receives the sensor data.

To enable filtering of the sensor data, the signal processing system 502, at block 904, processes the sensor data using a plurality of machine learning models. The signal processing system 502 can process the sensor data to identify a plurality of capture session collections represented in and/or by the sensor data. Each capture session collection may represent sensor data of or associated with one or more sensor data capture sessions. Further, each capture session collection may represent sensor data that conforms to a particular category of capture session from a plurality of categories of capture session.

Each machine learning model can identify whether the sensor data conforms to a particular category of capture session corresponding to the machine learning model. Further, each machine learning model can identify the one or more sensor data capture sessions associated with the particular category of capture session corresponding to the machine learning model.

The categories of capture session may define related data across sensor data capture sessions. In some cases, a category of capture session may identify a status of vehicle. The sensor data of one or more sensor data capture sessions that conforms to the category may be associated with a particular status of the vehicle. For example, the status of the vehicle may be a speed, acceleration, orientation, location, or position of the vehicle.

The category of capture session may identify a status of a pedestrian identified by the sensor data. The sensor data of one or more sensor data capture sessions that conforms to the category may be associated with a particular status of the pedestrian.

The category of capture session may identify an environmental characteristic identified by the sensor data. The sensor data of one or more sensor data capture sessions that conforms to the category may be associated with a particular environmental characteristic. For example, the environmental characteristic may be lighting, lighting conditions, weather, etc.

The category of capture session may identify an object, type of object, class of object, location of an object, etc. identified by the sensor data. The sensor data of one or more sensor data capture sessions that conforms to the category may be associated with a particular object, type of object, or class of object. For example, the object may be a bicycle, a vehicle, a pedestrian, a bird, a plane, a building, an object located in a particular region (e.g., the sky), etc. The category of capture session my define a quantity of objects associated with the sensor data that correspond to a particular object, type of object, class of object, location of an object, etc. For example, the category of capture session may define how the rarity of an object based on the sensor data.

The category of capture session may identify an object, type of object, class of object, location of an object, etc. based on a performance of a machine learning model. For example, the category of capture session may identify sensor data includes a particular object, type of object, class of object, location of an object, etc. that a machine learning model (e.g., the same or a different machine learning model then the machine learning model to be trained) has mislabeled, misclassified, etc. based on the performance of the machine learning model being less than a threshold value.

The signal processing system 502 may define the categories of capture session using the plurality of machine learning models and the features of the sensor data. Further, the signal processing system 502 may determine identifiers of each category of capture session and provide the identifiers to a user computing device (e.g., an end user computing device). For example, the signal processing system 502 can cause display of the identifiers via a display (e.g., a user interface) of the user computing device. The signal processing system 502 may receive, from the user computing device, a selection of an identifier. The selection of an identifier may identify a user-specified category (a particular category of the categories of capture session) for filtering the sensor data. Therefore, the signal processing system 502 processes the sensor data using the plurality of machine learning models.

Based on processing the sensor data, the signal processing system 502, at block 906, filters the sensor data based on the user-specified category. The signal processing system 502 can filter the sensor data to identify a capture session collection that represents sensor data of sensor data capture sessions that conforms to the user-specified category. For example, the signal processing system 502 can filter the sensor data to identify sensor data that includes a particular rare object based on determining less than threshold quantity of objects associated with the sensor data correspond to the rare object. The signal processing system 502 can cause display of the sensor data of sensor data capture sessions that conforms to the user-specified category via the display of the user computing device. In response to and/or based on causing display of the sensor data, the signal processing system 502 may receive a confirmation from the user computing device. The confirmation from the user computing device may identify that the sensor data can be annotated. Therefore, the signal processing system 502 filters the sensor data based on the user-specified category.

Based on filtering the sensor data, the signal processing system 502, at block 908, transmits sensor data of one or more sensor data capture sessions that conforms to the user-specified category. The signal processing system 502 may transmit (e.g., route) the sensor data to a user computing device. For example, the signal processing system 502 may transmit the sensor data for annotation based on receiving the confirmation from the user computing device. In some embodiments, the signal processing system 502 may perform annotation of the sensor data. For example, the signal processing system 502 may include a network to perform annotation.

Based on transmitting the sensor data for annotation and/or the signal processing system 502 performing annotation, annotated sensor data may be generated. The annotated sensor data may include an annotation associated with an object within an image. For example, the annotation may identify an object within an image as a bicycle. The signal processing system 502 can train a machine learning model using the annotated sensor data to define an expected output of the machine learning model. Therefore, the signal processing system 502 transmits the sensor data of the one or more sensor data capture sessions.

It will be understood that the routine 900 can be repeated multiple times for training of different machine learning models. In some cases, the signal processing system 502 may iteratively repeat the routine 900 for multiple sets of sensor data received from the same sensor. Further, the signal processing system 502 may repeat the routine 900 for different sensors.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A method comprising:
receiving, with at least one processor, sensor data captured by at least one sensor;
processing, with the at least one processor, the sensor data using a plurality of machine learning models to identify a plurality of capture session collections represented in the sensor data, a machine learning model of the plurality of machine learning models configured to identify at least a portion of the sensor data as conforming to a category of capture session from a plurality of categories of capture session; and
filtering, with the at least one processor, the sensor data based at least partly on a user-specified category of the plurality of categories of capture session to identify a capture session collection, of the plurality of capture session collections, representing at least a portion of the sensor data classified as conforming to the user-specified category.

2. The method of claim 1, wherein the sensor data is captured during a plurality of sensor data capture sessions.

3. The method of claim 1, wherein the sensor data is captured by at least one sensor during at least one vehicle trip.

4. The method of claim 1, wherein a second machine learning model of the plurality of machine learning models is configured to identify at least a second portion of the sensor data as conforming to a second category of capture session from the plurality of categories of capture session.

5. The method of claim 1 further comprising transmitting, with the at least one processor, the at least a portion of the sensor data classified as conforming to the user-specified category to a computing device.

6. The method of claim 1, wherein the at least a portion of the sensor data classified as conforming to the user-specified category corresponds to a plurality of sensor data capture sessions.

7. The method of claim 1, wherein the sensor data comprises at least one of camera data, lidar data, or radar data.

8. The method of claim 1, wherein the at least one sensor comprises at least one of a camera image sensor, a lidar sensor, or a radar sensor.

9. The method of claim 1 further comprising:
routing, with the at least one processor, the at least a portion of the sensor data classified as conforming to the user-specified category for annotation to generate annotated sensor data, wherein the annotated sensor data comprises an annotation associated with an object within an image; and
training, with the at least one processor, an additional machine learning model based at least in part on the annotated sensor data.

10. The method of claim 1 further comprising:
causing, with the at least one processor, display of the at least a portion of the sensor data classified as conforming to the user-specified category via a display of a computing device;
receiving, with the at least one processor, a confirmation from the computing device based at least in part on causing display of the at least a portion of the sensor data classified as conforming to the user-specified category; and
routing, with the at least one processor, the at least a portion of the sensor data classified as conforming to the user-specified category for annotation to generate annotated sensor data based at least in part on receiving the confirmation from the computing device.

11. The method of claim 1, wherein the at least one sensor is associated with a vehicle, wherein the user-specified category identifies a particular status of the vehicle, wherein the at least a portion of the sensor data classified as conforming to the user-specified category is associated with the particular status of the vehicle, and wherein the particular status of the vehicle comprises at least one of a speed of the vehicle, an acceleration of the vehicle, an orientation of the vehicle, a location of the vehicle, or a position of the vehicle.

12. The method of claim 1, wherein the user-specified category identifies a particular environmental characteristic, wherein the at least a portion of the sensor data classified as conforming to the user-specified category is associated with the particular environmental characteristic, and wherein the particular environmental characteristic comprises at least one of lighting, weather, or time of day.

13. The method of claim 1, wherein the user-specified category identifies a particular type of object, wherein the at least a portion of the sensor data classified as conforming to the user-specified category is associated with the particular type of object, and wherein the particular type of object comprises at least one of a bicycle, a vehicle, or a pedestrian.

14. The method of claim 13, wherein filtering the sensor data is further based at least in part on determining less than a threshold quantity of objects associated with the at least a portion of the sensor data classified as conforming to the user-specified category correspond to the particular type of object.

15. The method of claim 1, wherein the at least a portion of the sensor data classified as conforming to the user-specified category identifies an object is located in a particular region.

16. The method of claim 1, wherein the at least a portion of the sensor data classified as conforming to the user-specified category identifies sensor data associated with a performance of a particular machine learning model less than a threshold value.

17. The method of claim 1, wherein the sensor data is captured during a plurality of sensor data capture sessions, wherein each of the plurality of sensor data capture sessions correspond to a sequence of sensor data associated with a vehicle trip.

18. The method of claim 1, wherein the sensor data is captured during a plurality of sensor data capture sessions, and wherein the sensor data comprises first sensor data captured by a first sensor associated with a vehicle during the plurality of sensor data capture sessions and second sensor data captured by a second sensor associated with the vehicle during the plurality of sensor data capture sessions.

19. A system, comprising:
at least one processor, and
at least one non-transitory storage media storing instructions that, when executed by the at least one processor, cause the at least one processor to:
receive sensor data captured by at least one sensor;
process the sensor data using a plurality of machine learning models to identify a plurality of capture session collections represented in the sensor data, a machine learning model of the plurality of machine learning models configured to identify at least a portion of the sensor data as conforming to a category of capture session from a plurality of categories of capture session; and
filter the sensor data based at least partly on a user-specified category of the plurality of categories of capture session to identify a capture session collection, of the plurality of capture session collections, representing at least a portion of the sensor data classified as conforming to the user-specified category.

20. At least one non-transitory storage media storing instructions that, when executed by a computing system comprising a processor, cause the computing system to:
receive sensor data captured by at least one sensor;
process the sensor data using a plurality of machine learning models to identify a plurality of capture session collections represented in the sensor data, a machine learning model of the plurality of machine learning models configured to identify at least a portion of the sensor data as conforming to a category of capture session from a plurality of categories of capture session; and
filter the sensor data based at least partly on a user-specified category of the plurality of categories of capture session to identify a capture session collection, of the plurality of capture session collections, representing at least a portion of the sensor data classified as conforming to the user-specified category.

* * * * *